Nov. 15, 1960  K. PENTZLIN  2,960,045
MAKING MOLDED PASTRY
Filed Oct. 24, 1955
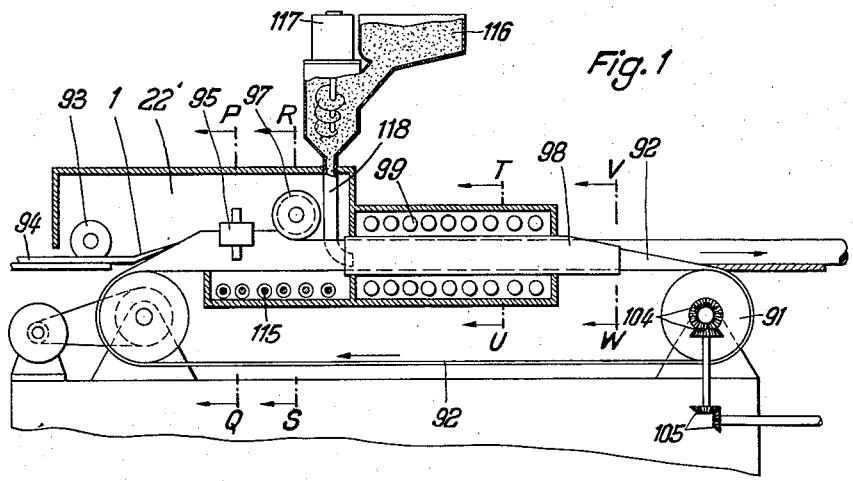
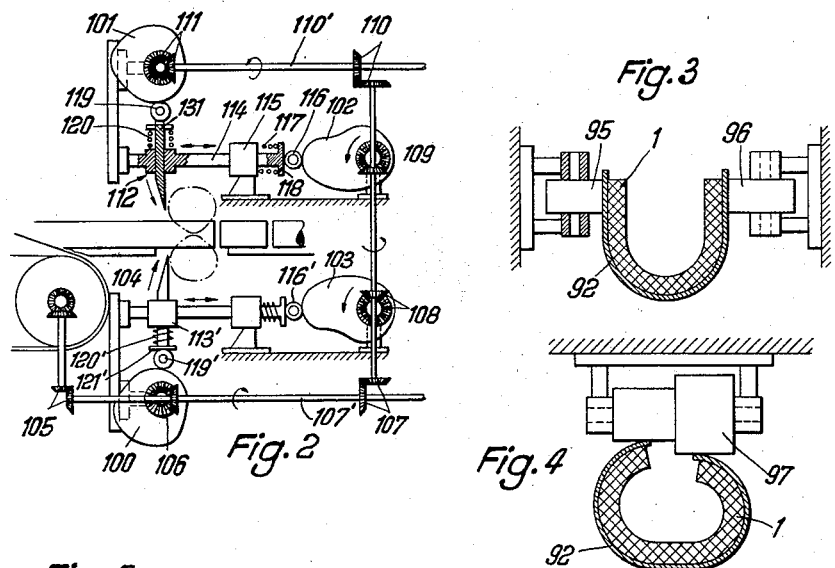
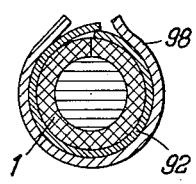
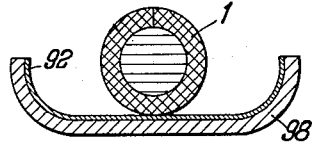
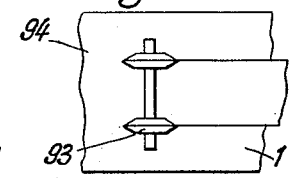
Inventor:
K. Pentzlin

2,960,045
MAKING MOLDED PASTRY

Kurt Pentzlin, Podbielskistrasse 353, Hannover, Germany

Filed Oct. 24, 1955, Ser. No. 542,381

Claims priority, application Germany Feb. 25, 1950

3 Claims. (Cl. 107—54)

The invention relates to a method for making molded pastries from cooked pastes, and more particularly has reference to waffle pastes, which are in a warm state after cooking and are still deformable. The application is a continuation in part of my co-pending application, Serial No. 211,234 filed February 16, 1951 now abandoned.

Heretofore, pastry of this character has been made by a discontinuous process, such as folding together the cooked and still warm sheets of waffle by hand, cutting the sheets, and pressing the sheets immediately after the cutting step. In the pressing step, excessively large pieces were then divided into a plurality of smaller pieces.

The present invention does not employ such techniques, and, broadly comprises drawing an endless length of cooked pastry, still in a deformable condition, after cooking, continuously through a molding zone, and if necessary, deforms the length further while conveying the same and immediately thereafter dividing the length into the desired sizes, preferably after the length has become rigid or set.

The invention further comprises forming a substantially flat strip of cooked paste, passing the strip through a heated zone in which the strip is progressively shaped into partially tubular form, passing the partially tubular formed strip through a zone at a lower temperature than the heated zone to complete the tubular formed strip and set the strip in such tubular form, and then dividing the tubular strip into sections of the desired length.

With the invention, it is possible to manufacture completely automatically molded pastry of this character and including the final packing of the pastry in boxes without the pastry being touched by human hands. Furthermore, the invention results in a materially greater output than could be realized by the discontinuous process referred to above.

The invention can also be used to manufacture hollow pastries wherein the pastry length is given a hollow form by an endless belt which is temporarily bent to define a molding channel and the pastry length remains in the channel until it becomes rigid, after which it is divided into the sections of the desired size.

According to another feature of the invention, an endless belt is guided through a tube against the inner wall of which, it presses at all points and thus assumes the cross-sectional configuration of the tube.

In connection with filled hollow pastry, it is advantageous to continuously fill the length during the forming of the hollow shape of the length, with the filling being effected shortly prior to the closure of the hollow shape.

It is also within the scope of the invention to provide means to divide fairly wide endless lengths of material into a plurality of narrower lengths, the width of each length corresponding to the width of the pastry strip required for the manufacture of the product in question.

In addition, a wide length of pastry leaving the oven may be divided by circular knives and the like into a number of separate, narrower strips, and each of such strips may be subjected to the forming steps heretofore described.

A molding machine of known type may be equipped with an endless conveying and molding belt of flexible material and in the formation of hollow pastries, the belt being guided through a tube having a cross-section corresponding to the required form of the molding belt, whereby the tube folds the belt together to define a mold of the desired hollow form.

To ensure that each length of pastry will assume a fully closed hollow form, the inner circumference of the tube may be less than the width of the belt so that the edges of the belt must overlap within the tube so that the lateral edges of the pastry length will be pressed against one another.

In a further embodiment, the edges of the belt which are inclined toward each other may be caused to overlap by the provision, in front of the tube, of a stepped roller which serves to guide one edge of the belt under the other edge.

The invention also includes a filling unit, located a short distance in front of the point at which the belt closes for forcing the filling, under pressure into the closing hollow body.

It is additionally possible to employ several devices arranged in side by side relationship to divide the endless length of pastry longitudinally as it leaves the cooking zone.

With the above and other important objects and advantages in view, the invention consists in the details of construction, and in the arrangement and combination of parts to be later more fully described and claimed.

In describing the invention in detail, reference will be had to the accompanying drawing forming part of this application, wherein like reference characters indicate the same or similar parts in the several views, and, in which:

Fig. 1 is a diagrammatic longitudinal sectional view of the apparatus suitable for performing the method of this invention, Fig. 2 is a diagrammatic view partly in cross section of a severing means, Figs. 3 to 6 are cross-sectional views taken along the lines P—Q, R—S, T—U, and V—W of Fig. 1, and, Fig. 7 is a top plan view of means to divide the length of pastry longitudinally.

With reference to Fig. 1, I provide an endless conveying and molding belt 92, preferably made of metal or like flexible material which is passed over direction changing drums or cylinders 91. The pastry length 1 moves on the belt and the length may be separated from a wider length of pastry 94 by means of circular knives 93 when the length 94 leaves the cooking machine.

The belt 92 which moves in the direction indicated by the arrow is bent or displaced into the shape of a trough by opposed rollers 95 and 96 (Fig. 3), with the length of pastry assuming a like shape at the same time. A stepped roller 97 as shown in Fig. 4 then functions to bend the edges of the belt 92 together so that the edges substantially meet as the belt thereafter enters a molding tube 98, which brings the edges of the strip into abutting relationship to define a tubular body. The molding tube 98 continues to guide the belt in its closed shape whereupon the pastry will likewise be of hollow form.

A cooling device 99 disposed about the tube 98 will ensure cooling of the pastry while it is in such hollow form to a temperature at which it is no longer deformable.

When the belt leaves the tube 98, it again assumes its flattened shape (Fig. 6) thereby releasing the formed hollow pastry.

The molding operation effected by the coaction of the rollers 95, 96 and 97 with the belt is within a chamber 22' wherein the pastry is kept in a deformable state by maintaining the chamber at the required temperature by suitable heating means 115. In connection with filled pastries, a supply container 116 for the filling communicates with a motor driven force feed unit 117 which feeds the filling through a conduit 118 into the mold at the point where the pastry length closes to define the finished hollow body as can be seen in Fig. 1. Obviously, other types of force feeds may be used in lieu of that shown.

After the pastry has been finally formed, sections of the desired size are cut from the endless length by a cutting means. As best illustrated in Fig. 2, the cutting means comprises four cam discs 100, 101, 102 and 103 and such discs are driven by the right hand drum 91 by bevel gear assemblies 104, 105, 106, 107, 108, 109, 110 and 111. It will be seen that the bevel gear assemblies 107 and 110 are carried by horizontally disposed shafts 107' and 110' respectively.

The cutter is capable of horizontal and vertical movements and the cutter includes an upper knife 112 and a lower knife 113'. The upper knife is mounted in a carrier 114 which is movable in both directions horizontally and the carrier passes through a support 115 fixed at a point above the apparatus. A roller 116 is provided at the inner end of the carrier and a coil spring 117 positioned between the support 115 and an enlargement 118 on the carrier serves to urge the roller against the profile of the cam disc 102.

The knife 112 is also vertically movable in the carrier 114 and the upper end of the knife supports a roller 119 and the roller is maintained against the profile of the cam disc 101 by a spring 120 disposed between the carrier and the flange 131 on the knife 112.

The knife 113' is mounted in a similar fashion and the same numerals are applied with the exception that they are primed. The roller 116' is pressed against the profile of the cam disc 103 and the roller 119' against the profile of the disc 100. The knife 113' operates through a slot in the discharge trough and the cam profiles are such that the two knives 112 and 113' follow the movement paths shown by the broken lines in Figure 2.

The cooked material prior to its entry into the chamber 22' is at normal room temperature, namely about 20° C. and the material is in the nature of baked dough. In the chamber, the temperature is above the point of evaporation, i.e. 110–120° C. and while the material is harder than at the time of its entrance into the chamber, it is still flexible or workable. The temperature in the tube 98 is lower than that in the chamber 22', but is higher than room temperature, namely about 40° C. and the characteristics of the material are substantially the same as in the chamber 22'. After leaving the tube, the material is at room temperature, i.e. about 20° C. and is hardened gluten and crystallized sugar. Thus, the material is hard, brittle, dry and inflexible thereby providing the finished fragile pastry product.

The invention is not to be confined to any strict conformity with the showings in the drawings but may be changed or modified so long as such changes or modifications mark no material departure from the salient features of the invention as expressed in the appended claims.

I claim:

1. A method of making a shaped dough product comprising introducing a flat strip of cooked but still deformable dough into a first combined heating and shaping zone, and in said zone passing the strip into contact with a flexible shaping belt and moving the edges of the belt toward each other to initiate shaping of the dough while applying heat thereto to harden the dough without destroying its deformability, continuing the movement of the dough strip with the belt through an immediately consecutive combined cooling and shaping zone and in said zone shaping the strip to tubular form by moving the edges of the belt into overlapping relation about the dough strip.

2. A method as claimed in claim 1, including the further step of introducing a filling material into the product in the combined shaping and cooling zone.

3. A method as claimed in claim 1, in which the temperature of the first zone is of the order of 110°–120° C., and the temperature of the second zone is of the order of 40° C.

References Cited in the file of this patent

UNITED STATES PATENTS

| | | |
|---|---|---|
| 498,142 | Thoens | May 23, 1893 |
| 797,276 | Glauser | Aug. 15, 1905 |
| 1,176,648 | Callow | Mar. 21, 1916 |
| 1,370,800 | Egerton | Mar. 8, 1921 |
| 1,473,289 | Green | Nov. 6, 1923 |
| 1,542,710 | Laskey | June 16, 1925 |
| 1,915,528 | Haug | June 27, 1933 |
| 1,951,549 | Kirchhoff | Mar. 20, 1934 |
| 2,003,578 | Clement | June 4, 1935 |
| 2,004,530 | Howe et al. | June 11, 1935 |
| 2,246,477 | Attaway et al. | June 17, 1941 |
| 2,508,724 | Moffett | May 23, 1950 |
| 2,572,833 | Balzarini | Oct. 30, 1951 |
| 2,581,769 | Olson | Jan. 8, 1952 |
| 2,660,961 | Neutelings et al. | Dec. 1, 1953 |

FOREIGN PATENTS

| | | |
|---|---|---|
| 365,735 | Great Britain | Jan. 28, 1932 |